(12) United States Patent
Imamiya et al.

(10) Patent No.: US 11,323,053 B2
(45) Date of Patent: May 3, 2022

(54) BIPOLAR STEPPER MOTOR DRIVING DEVICE

(71) Applicant: DENSO CORPORATION, Kariya (JP)

(72) Inventors: Kenta Imamiya, Kariya (JP); Mitsuru Aoki, Kariya (JP); Yasuhiko Harada, Kariya (JP)

(73) Assignee: DENSO CORPORATION, Kariya (JP)

( * ) Notice: Subject to any disclaimer, the term of this patent is extended or adjusted under 35 U.S.C. 154(b) by 40 days.

(21) Appl. No.: 16/812,635

(22) Filed: Mar. 9, 2020

(65) Prior Publication Data

US 2020/0295685 A1 Sep. 17, 2020

(30) Foreign Application Priority Data

Mar. 13, 2019 (JP) .............................. JP2019-045893

(51) Int. Cl.
*H02P 8/38* (2006.01)

(52) U.S. Cl.
CPC ..................... *H02P 8/38* (2013.01)

(58) Field of Classification Search
CPC ..... H02P 6/18; H02P 6/06; H02P 6/14; H02K 29/12; H02K 21/24; G04C 3/16; H01R 39/46
See application file for complete search history.

(56) References Cited

U.S. PATENT DOCUMENTS

| 8,836,269 B2 * | 9/2014 | Hartzsch | H02P 8/36 318/685 |
| 2004/0232874 A1 * | 11/2004 | Fukamizu | H02P 8/20 318/696 |
| 2009/0243526 A1 | 10/2009 | Ito et al. | |
| 2010/0201297 A1 * | 8/2010 | Nachev | H02P 6/08 318/400.34 |

FOREIGN PATENT DOCUMENTS

DE    102018203460 A1 * 10/2018  ......... G01R 19/0092

* cited by examiner

*Primary Examiner* — Said Bouziane
(74) *Attorney, Agent, or Firm* — Posz Law Group, PLC (57) ABSTRACT

A bipolar stepper motor driving device drives a stepper motor including stator coils having plural phases. The bipolar stepper motor driving device includes H-bridge circuits, a current detector, a control circuit, and a re-turning-on instruction unit. The H-bridge circuits are provided correspondingly to the phases of the respective stator coils. The current detector detects current flowing in the stator coils. The control circuit executes drive control of the H-bridge circuits. The re-turning-on instruction unit commands the control circuit to switch into a short-circuited state a stator coil which has shifted from an energized state to an off-state among the stator coils, on a condition that an absolute value of a reverse current detected by the current detector has changed from a value larger than a threshold current value to a value smaller than the threshold current value.

11 Claims, 11 Drawing Sheets

BIPOLAR STEPPER MOTOR DRIVING DEVICE

CROSS REFERENCE TO RELATED APPLICATIONS

This application is based on Japanese Patent Application No. 2019-45893 filed on Mar. 13, 2019, the disclosure of which is incorporated herein by reference.

TECHNICAL FIELD

The present disclosure relates to a bipolar stepper motor driving device.

BACKGROUND

A bipolar stepper motor driving device may execute drive control of a stepper motor by open-loop control.

SUMMARY

The present disclosure describes a bipolar stepper motor driving device executing drive control of a stepper motor.

BRIEF DESCRIPTION OF DRAWINGS

The above and other objects, features and advantages of the present disclosure will become more apparent from the following detailed description made with reference to the accompanying drawings. In the drawings.

DETAILED DESCRIPTION

A bipolar stepper motor driving device may execute drive control of a stepper motor by open-loop control. Hence, no change is made in preset driving torque and driving speed for the stepper motor. No mechanism is provided for stabilizing the operation of the motor.

During the driving of the motor, when the followability of the motor deteriorates due to some factor to bring about an advance or delay of a phase, the operation may not be stabilized to bring the motor into a step-out state.

In one or more embodiments of the present disclosure, a bipolar stepper motor driving device is provided to ensure a stable operation by improving followability even during driving of a stepper motor.

According to an aspect of the present disclosure, a bipolar stepper motor driving device drives a stepper motor including stator coils having different phases. The bipolar stepper motor driving device includes H-bridge circuits, a current detector, a control circuit, and a re-turning-on instruction unit. The H-bridge circuits are provided correspondingly to respective stator coils. The current detector detects current flowing in each of the plural-phase stator coils. The control circuit executes drive control of the H-bridge circuits to switch respective states of the stator coils. The re-turning-on instruction unit commands the control circuit to switch into a short-circuited state a stator coil which has shifted from an energized state to an off-state among the stator coils, on a condition that an absolute value of a reverse current detected by the current detector has changed from a value larger than a threshold current value to a value smaller than the threshold current value.

The control circuit drives multiple H-bridge circuits in a predetermined order, energizes the stator coils in the stepper motor in a predetermined pattern, and subsequently turns off the energized H-bridge circuit. In the stator coil, a counter electromotive force is generated due to self-inductance, and the absolute value of the reverse current of the H-bridge circuit, detected by the current detector, decreases to change from a value larger than a threshold current value to a value smaller than the threshold current value. When the absolute value of the reverse current becomes smaller than the threshold current value and approaches zero, the re-turning-on instruction unit accordingly commands the control circuit to bring the H-bridge circuit into the short-circuited state. As a result, the de-energized H-bridge circuit turns into the short-circuited state and functions so as to prevent a rotor of the stepper motor from swinging. Therefore, it may be possible to obtain a stably-rotating state.

First Embodiment

The following describes a first embodiment with reference to FIGS. 1 to 5.

Figure 1:
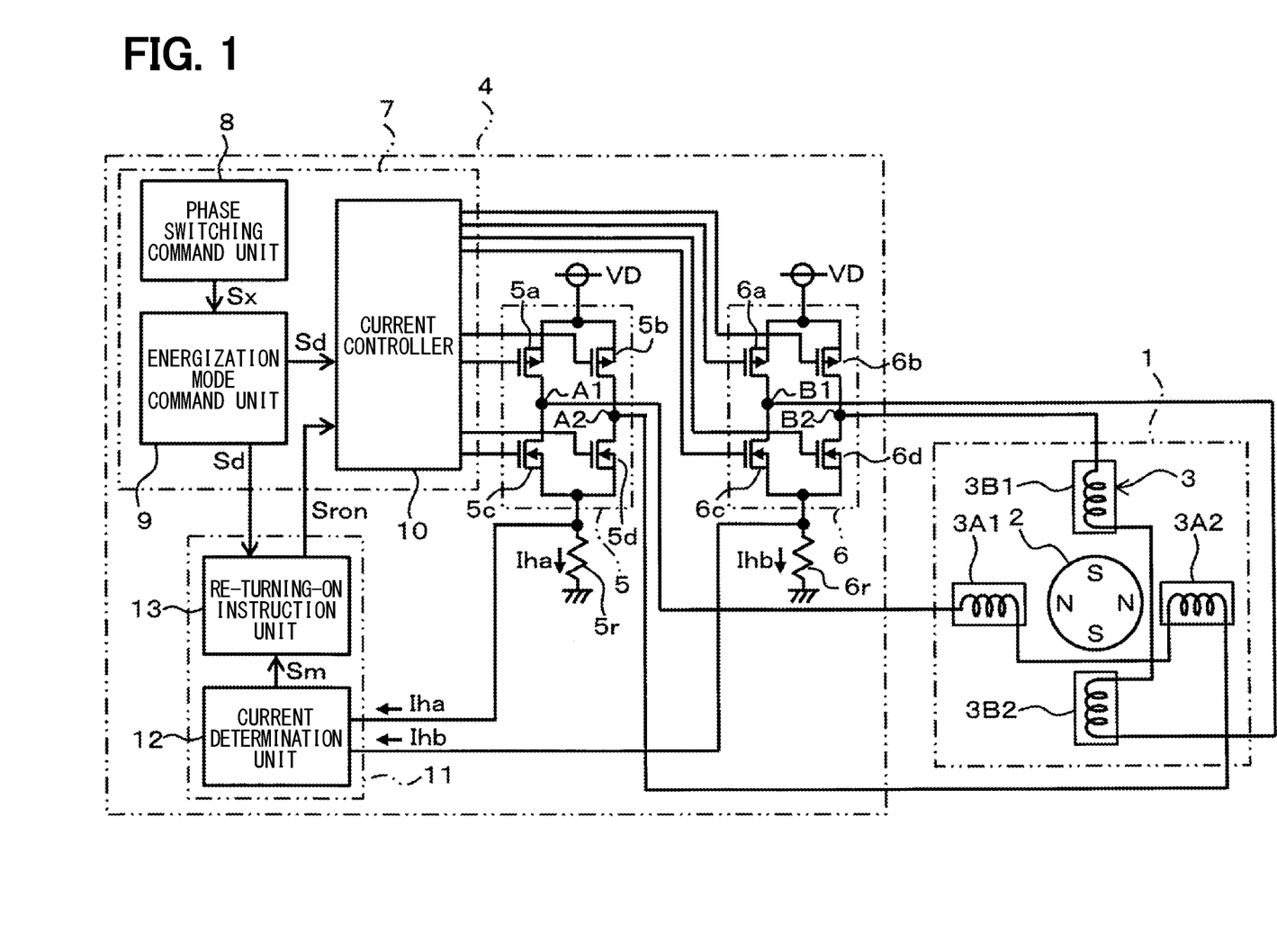
FIG. 1 is an electrical configuration diagram showing a first embodiment.

In FIG. 1, a stepper motor 1 includes a rotor 2 and a stator 3 and is of a two-phase bipolar type. The rotor 2 includes a permanent magnet, and is formed to be magnetized at positions where N and S poles oppose each other across the center of rotation, corresponding to two phases of an A-phase and a B-phase. The stator 3 is disposed such that four stator coils 3A1, 3A2, 3B1, 3B2 of an A1-phase, an A2-phase, a B1-phase, and a B2-phase surround the rotor 2, corresponding to the A-phase and the B-phase.

The following describes the configuration of a stepper motor driving device 4.

H-bridge circuits 5, 6 are circuits for switching energization to the four stator coils 3A1, 3A2, 3B1, 3B2 of the stepper motor 1, and constitute full-bridge circuits in which four metal-oxide-silicon (MOS) transistors 5a to 5d and four MOS transistors 6a to 6d are bridge-connected, respectively. The MOS transistors 5a, 5b, 6a, 6b serving as high-side switches each are of a p-channel type. Further, the MOS transistors 5c, 5d, 6c, 6d serving as low-side switches each are of an n-channel type. The MOS transistors 5a to 5d and 6a to 6d all include parasitic diodes, and these parasitic diodes form a reflux path from the ground to a power supply when turned off.

The H-bridge circuit 5 has a configuration in which a series circuit of the MOS transistors 5a, 5c and a series circuit of MOS transistors 5b, 5d are connected in parallel. The H-bridge circuit 5 has one end connected to a direct-current (DC) power supply VD and the other end connected to the ground via a current detection resistor 5r (simply referred to as "resistor"). A connection point A1 between the MOS transistors 5a, 5c is connected to a connection point A2 between the MOS transistors 5b, 5d via A-phase stator coils 3A1, 3A2 of the stepper motor 1 in series.

Similarly, the H-bridge circuit 6 has a configuration in which a series circuit of the MOS transistors 6a, 6c and a series circuit of MOS transistors 6b, 6d are connected in parallel. The H-bridge circuit 6 has one end connected to a DC power supply VD and the other end connected to the ground via a current detection resistor 6r (simply referred to as "resistor"). A connection point B1 between the MOS transistors 6a, 6c is connected to a connection point B2 between the MOS transistors 6b, 6d via B-phase stator coils 3B1, 3B2 of the stepper motor 1 in series.

A control circuit 7 applies a gate drive signal to each of the MOS transistors 5a to 5d and 6a to 6d in the H-bridge circuits 5, 6. The control circuit 7 corresponds to a first control circuit. The control circuit 7 includes a phase switching command unit 8, an energization mode command unit 9, and an energization controller 10. The phase switching command unit 8 outputs, to the energization mode command unit 9, a switching signal Sx for indicating the energization directions of the A-phase and the B-phase of the stepper motor 1. Based on the switching signal Sx from the phase switching command unit 8, the energization mode command unit 9 generates any of energization mode signals Sd of "+energization," "−energization," and "off" for the A-phase and B-phase of the stepper motor 1, and applies the generated signal to the current controller 10.

A swing prevention circuit 11 holds the stability in the rotation of the stepper motor 1. The swing prevention circuit 11 corresponds to a second control circuit. The swing prevention circuit 11 includes a current determination unit 12 and a re-turning-on instruction unit 13. The current determination unit 12 has a current detection circuit as a current detector. The current determination unit 12 detects currents Iha, Ihb, respectively flowing in the two H-bridge circuits 5, 6, from the terminal voltages of the resistors 5r, 6r. The current determination unit 12 specifically compares a reverse current value with a threshold current value −IL (IL is a positive value). In the following description, the comparison is made using the current value, but in practice, the determination is made by comparing the terminal voltages of the resistors 5r, 6r with a threshold voltage corresponding to the threshold current value.

The current determination unit 12 detects a change in each of the phase currents Iha, Ihb of the A-phase and the B-phase from a value smaller than the threshold current value −IL to a value larger than the threshold current value −IL. At this time, the current after the de-energization becomes a reverse current flowing in the stator and thus has a negative current value. It is thus determined that the absolute values of the reverse currents Iha, Ihb have changed from a state larger than the threshold current value IL to a state smaller than the threshold current value IL. Even when the directions of the energization to the A-phase and the B-phase are switched, the directions of the currents Iha, Ihb flowing in the resistors 5r, 6r are the same.

Since the phase currents Iha, Ihb of the A-phase and the B-phase have negative values after the de-energization, the phase currents Iha, Ihb have the relationship of the following equation (1) when being smaller than the threshold current value −IL. The phase currents Iha, Ihb of the A-phase and the B-phase have the relationship of the following equation (2) when being larger than the threshold current value −IL.

$$\text{Iha} < -\text{IL, or Ihb} < -\text{IL} \tag{1}$$

$$\text{Iha} > -\text{IL, or Ihb} > -\text{IL} \tag{2}$$

The re-turning-on instruction unit 13 receives an input of the energization mode signal Sd from the energization mode command unit 9. The re-turning-on instruction unit 13 receives an input of a determination signal Sm from the current determination unit 12. The re-turning-on instruction unit 13 outputs a re-turning-on signal Sron for the corresponding one of the H-bridge circuits 5 and 6 to the current controller 10 based on the two signals Sd, Sm.

Figure 2:
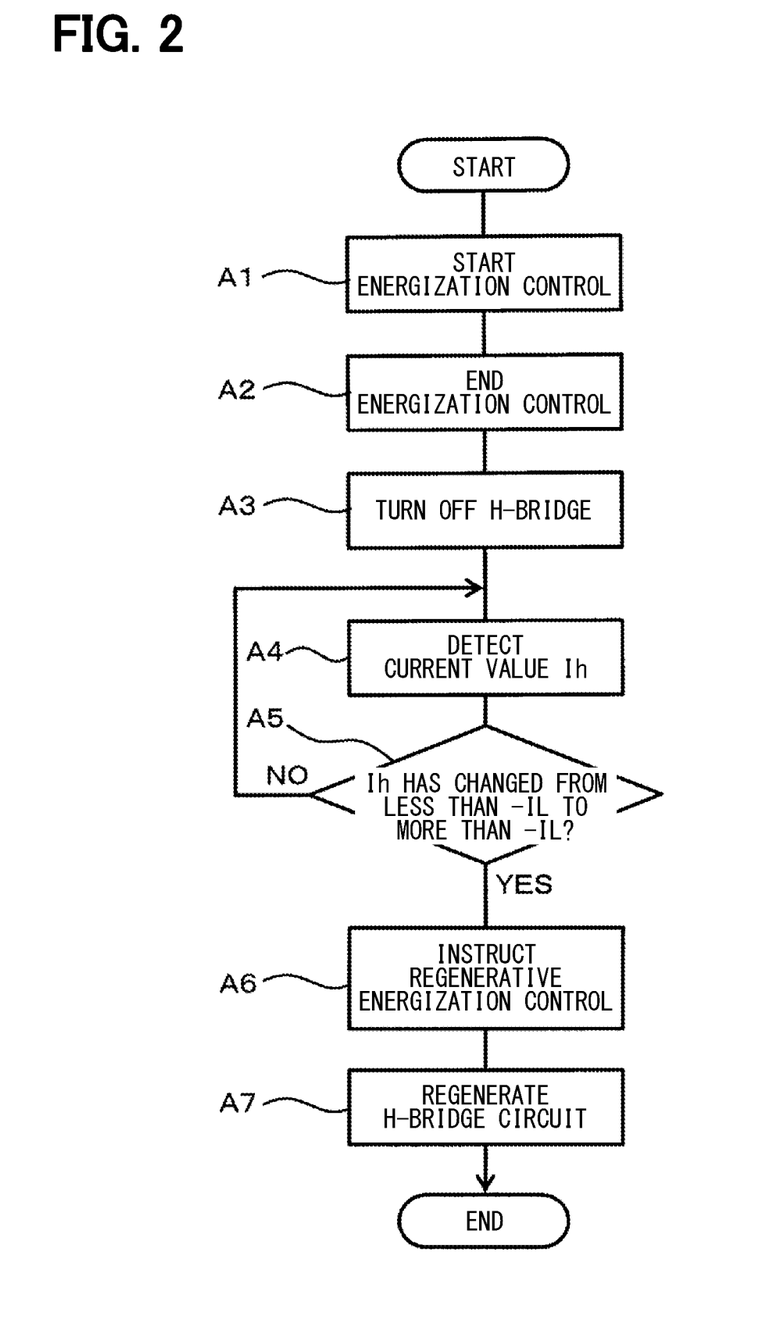
FIG. 2 is a diagram showing a flow of an energization control operation.
Figure 3:
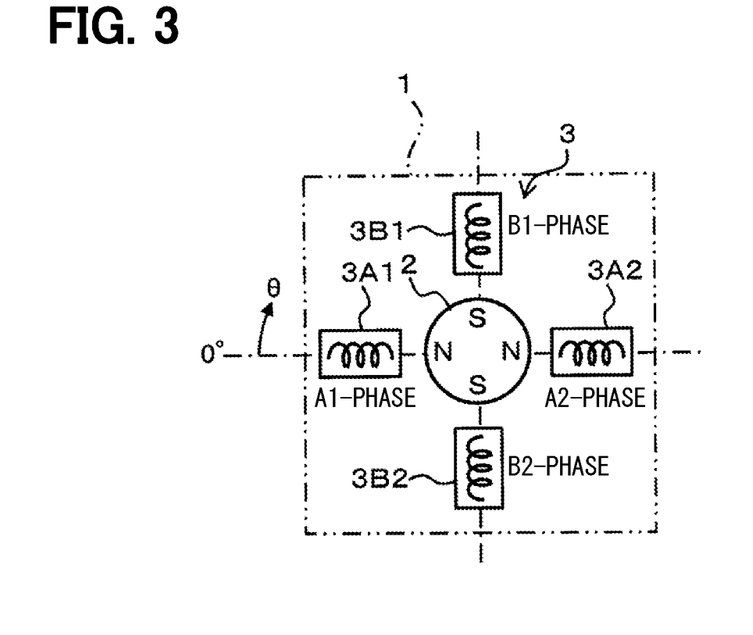
FIG. 3 is a diagram showing a relationship between a phase of a stepper motor and a control angle.
Figure 4:
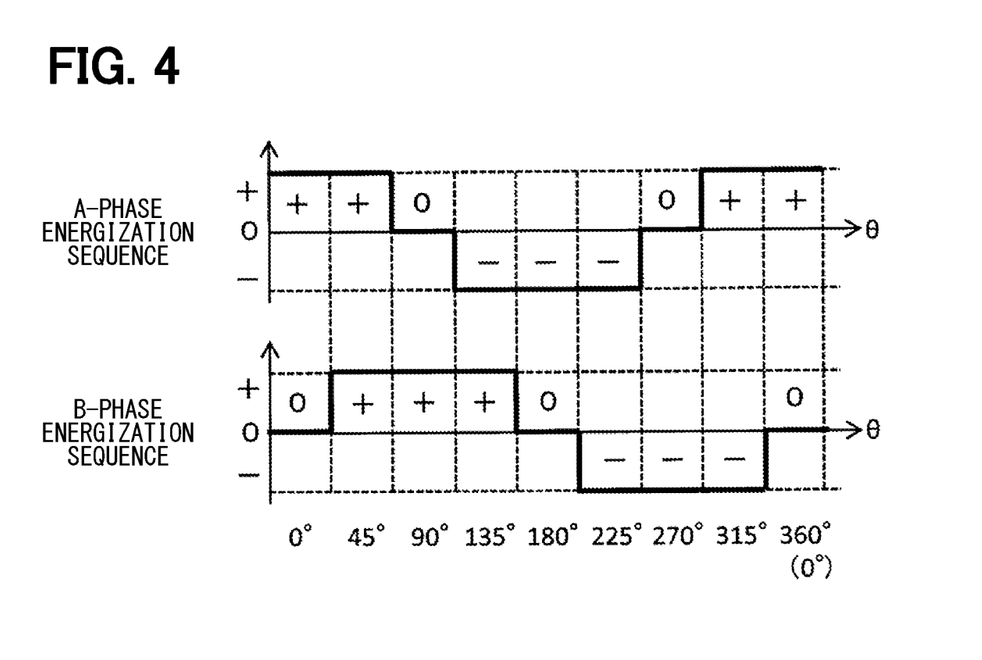
FIG. 4 is a diagram showing an energization sequence of an H-bridge circuit.

The following describes the action of the above configuration with reference to FIGS. 2 to 5. First, the drive control by the bipolar stepper motor 1 is described with reference to FIGS. 3 and 4. FIG. 3 shows a position of 0°, which is a reference position of a rotation angle θ of the rotor 2. FIG. 3 also shows the direction of the rotation angle θ. FIG. 4 shows the energization modes of the A-phase and the B-phase, that is, the H-bridge circuits 5, 6, with respect to the rotation angle θ of the rotor 2.

As shown in FIG. 3, in order to set the direction of one N pole of the rotor 2 to the reference position of the rotation angle θ, the rotation angle is defined as 0° when the N pole is on the A1-phase side of the stator coil 3A1. When the in-plane clockwise direction is taken as the positive direction of the angle, the direction of the N pole as the reference position of the stator 2 and the rotation angle θ are as follows. For the A-phase, the A1-phase is set at a rotation angle of 0° as the reference, and the A2-phase is set at a rotation angle of 180° which is the opposite position. Similarly, for the B-phase, the B1-phase is set at a rotation angle of 90°, and the B2-phase is set at an angle of 270° which is the opposite position. Specifically, the following are set.

A1-phase: θ=0°
Midpoint between A1-phase and B1-phase: θ=45°
B1-phase: θ=90°
Midpoint between B1-phase and A2-phase: θ=135°
A2-phase: θ=180°
Midpoint between A2-phase and B2-phase: θ=225°
B2-phase: θ=270°
Midpoint between B2-phase and A1-phase: θ=315°
A1-phase: θ=360°

As shown in FIG. 4, as the energized states of the A-phase of the H-bridge circuit 5 and the B-phase of the H-bridge circuit 6 corresponding to each value of the rotation angle θ of the rotor 2, "+energization," "−energization," and "off" are as follows. Herein, "+" indicates "+energization," "−" indicates "−energization," and "0" indicates "off."

θ=0°: (A, B)=(+, 0)
θ=45°: (A, B)=(+, +)
θ=90°: (A, B)=(0, +)
θ=135°: (A, B)=(−, +)
θ=180°: (A, B)=(−, 0)
θ=225°: (A, B)=(−, −)
θ=270°: (A, B)=(0, −)
θ=315°: (A, B)=(+, −)
θ=360°: (A, B)=(+, 0)

In the control of the energized state, in the present embodiment, the re-turning-on control is executed by the swing prevention circuit 11, but the execution timing is during an off-period when the phase energization control state, which is the state of transition to each of the following angle regions, is "off."

θ=45° to θ=90°: (A, B)=(+, +) to (A, B)=(0, +)
θ=135° to θ=180°: (A, B)=(−, +) to (A, B)=(−, 0)
θ=225° to θ=270°: (A, B)=(−, −) to (A, B)=(0, −)
θ=315° to θ=360°: (A, B)=(+, −) to (A, B)=(+, 0)

In the H-bridge circuit 5 or 6, the re-turning-on control is executed by the swing prevention circuit 11 so that, when "+energization" or the "−energization" is executed and then the shift is made to the off-state period, the rotor 2 is prevented from swinging due to the current flowing in each of the stator coils 3A1, 3A2, 3B1, 3B2.

FIG. 2 shows the flow of a control operation by the control circuit 7 as to a single energization control operation executed on the A-phase or the B-phase by the H-bridge circuit 5 or 6. The following provides a description along the flow of the control operation.

First, when receiving a drive signal from the outside, the control circuit 7 starts the control operation in step A1. The phase switching command unit 8 outputs the switching signal Sx to the energization mode command unit 9. The switching signal Sx corresponds to the phase to be energized between the A-phase and the B-phase. The energization mode command unit 9 outputs a "+energization" or "−energization" energization mode signal Sd to the current controller 10, to drive the corresponding one of the MOS transistors 5a to 5d or 6a to 6d of the corresponding H-bridge circuit 5 or 6. The "+energization" or "−energization" energization mode signal Sd corresponds to the rotation angle θ of the rotor 2 in the stepper motor 1.

In this case, when "+energization" is to be executed on the H-bridge circuit 5 as the A-phase, the current controller 10 brings the MOS transistors 5a, 5d into the on-state and brings the MOS transistors 5b, 5c into the off-state. Therefore, "+energization" is executed by the DC power supply VD from the stator coil 3A1 toward the stator coil 3A2. When "−energization" is to be executed on the H-bridge circuit 5 as the A-phase, the MOS transistors 5b, 5c are turned into the on-state and the MOS transistors 5a, 5d are turned into the off-state. Therefore, "−energization" is executed by the DC power supply VD from the stator coil 3A2 toward the stator coil 3A1, and the magnitude of the current value Iha becomes a constant current I0.

When "+energization" is to be executed on the H-bridge circuit 6 as the B-phase, the current controller 10 brings the MOS transistors 6a, 6d into the on-state and brings the MOS transistors 6b, 6c into the off-state. Therefore, "+energization" is executed by the DC power supply VD from the stator coil 3B1 toward the stator coil 3B2. When "−energization" is to be executed on the H-bridge circuit 6 as the B-phase, the MOS transistors 6b, 6c are turned into the on-state and the MOS transistors 6a, 6d are turned into the off-state. Therefore, "−energization" is executed by the DC power supply VD from the stator coil 3B2 toward the stator coil 3B1, and the magnitude of the current value Ihb becomes a constant current I0.

When the energization control is executed on the H-bridge circuit 5 or 6 by the current controller 10 for a predetermined time, in the subsequent step A2, the control circuit 7 applies the "off" energization mode signal Sd from the energization mode command unit 9 to the current controller 10 to stop energization control. In step A3, the energization from the DC power supply VD is stopped in the H-bridge circuit 5 or 6.

When the H-bridge circuit 5 or 6 turns into the off-state in step A3, the current flowing in the A-phase stator coil 3A1, 3A2 or the B-phase stator coil 3B1, 3B2 continues to flow by a counter electromotive force generated due to self-inductance. Hence, an induced current flows from the ground side toward the DC power supply VD side.

At this time, in the MOS transistors 5a to 5d or 6a to 6d, the current flows via the parasitic diode. Therefore, the current flowing at this time flows in the reverse direction to the resistor 5r or 6r, and current values Ih of the H-bridge circuits 5, 6, that is, Iha and Ihb, become negative current values.

In step A5, the current determination unit 12 detects the value of the negative current Iha or Ihb flowing in the H-bridge circuit 5 or 6 and compares the detected current value Iha or Ihb with the threshold current value −IL. When the current determination unit 12 detects that the current values Iha, Ihb have changed from the state of the equation (1) to the state of the equation (2) as comparison processing, the current determination unit 12 transmits the determination signal Sm to the re-turning-on instruction unit 13.

The state in which the determination signal Sm has been output is a state in which the negative currents Iha, Ihb flowing in the stator coils 3A1, 3A2 or the stator coils 3B1, 3B2 have approached the zero level. When the determination signal Sm is input in a state where the "off" energization mode signal Sd is applied from the energization mode command unit 9, in step A6, the re-turning-on instruction unit 13 transmits the re-turning-on signal Sron to the current controller 10 so that the regenerative energization is executed.

In step A7, as the regenerative energization control in the case of the A-phase, the current controller 10 drives to turn on the MOS transistors 5a, 5b as the high-side switches in the H-bridge circuit 5, and holds the MOS transistors 5c, 5d as the low-side switches in the off-state in the H-bridge circuit 5. Therefore, the A-phase stator coils 3A1, 3A2 turn into the closed-loop short-circuited state, and even when the rotor 2 swings, regenerative braking may be executed by generating current in a direction in which the rotor 2 is prevented from swinging.

In step A7, as the regenerative energization control in the case of the B-phase, the current controller 10 drives to turn on the MOS transistors 6a, 6b and holds MOS transistors 6c, 6d in the off-state in the H-bridge circuit 6. Therefore, the B-phase stator coils 3B1, 3B2 turn into the closed-loop short-circuited state, and the rotor 2 may be regeneratively braked to prevent the occurrence of vibration.

When the regenerative energization control in the off-state ends, one-time energization control is terminated. Subsequently, when the energization control signal is applied again, the control circuit 7 repeatedly executes the above processing.

The following describes the transition of the current values Iha, Ihb in each of the energization control modes of "+energization," "off," "re-turning-on control," and "−energization" in the H-bridge circuits 5, 6 in the control described above with reference to FIG. 5. When the control circuit 7 starts "+energization" at time t0, the current value Iha or Ihb of the H-bridge circuit 5 or 6 rises from "0" and is kept at the constant value I0.

Figure 5:
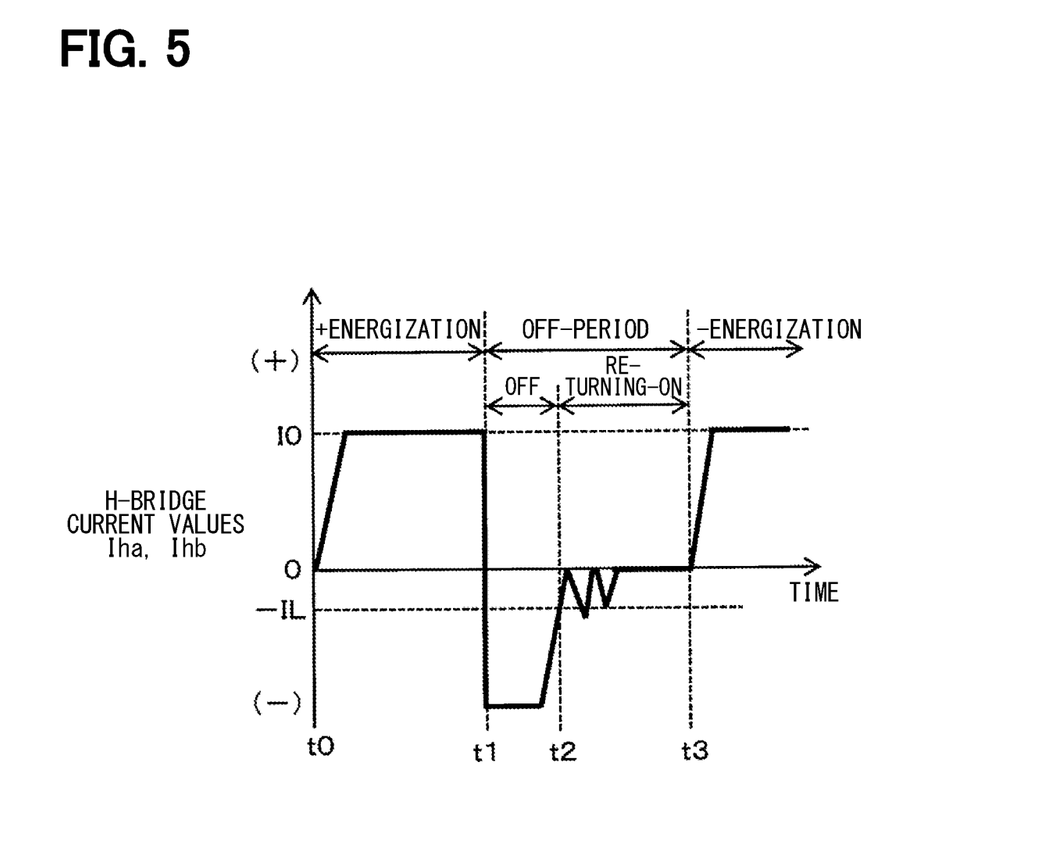
FIG. 5 is a time chart showing current changes in the H-bridge circuit.

At time t1, the control circuit 7 ends "+energization" on the H-bridge circuit 5 or 6 and makes a shift to the "off" state. At this time, in the stator coil 3A1, 3A2 or 3B1, 3B2 of the stator 3 in the stepper motor 1 where the energization has been stopped, a counter electromotive force is generated due to self-inductance. As a result, the induced current flows in the reverse direction in the H-bridge circuit 5 or 6 via the parasitic diode by the counter electromotive force of the stator coils 3A1, 3A2 or stator coils 3B1, 3B2 of the stator 3, and as shown in FIG. 5, the polarity of the current value Iha or Ihb is inverted.

When the time elapses after the H-bridge circuit 5 or 6 is turned "off," the absolute value of the current Iha or Ihb of the H-bridge circuit 5 or 6 decreases and approaches "0." When the current value Iha or Ihb exceeds the threshold current value −IL from the lower side and approaches "0" at time t2 during the off-period, this is detected by the current determination unit 12 in the swing prevention circuit 11, and the determination signal Sm is output to the re-turning-on instruction unit 13.

When turning into a state where both the "off" energization mode signal Sd and the determination signal Sm have been input, the re-turning-on instruction unit 13 transmits the re-turning-on signal Sron for the H-bridge circuit 5 or 6, in which the current is being detected, to the current controller 10 so that the re-turning-on control is executed. Therefore, the corresponding one of the series circuit of the stator coils 3A1, 3A2 and the series circuit of the stator coils 3B1, 3B2 is caused to turn into the short-circuited state, and the closed-loop current is prevented. It may be possible to prevent occurrence of a rotating state such as vibration of the rotor 2 in the stepper motor 1.

In a state where the re-turning-on control is being executed by the current controller 10, the current flowing in each of the series circuit of the stator coils 3A1, 3A2 and the series circuit of the stator coils 3B1, 3B2 in the closed loop does not flow to the resistor 5r or 6r. Although shown as Iha and Ihb in FIG. 5, the current is not actually current being detected by the current determination unit 12.

At time t3 when the off-period ends, the control circuit 7 starts "−energization." In the H-bridge circuit 5 or 6, the control is executed so as to energize the stator 3 in the reverse direction. At this time, in the resistor 5r or 6r of the H-bridge circuit 5 or 6, the current flows in the same direction, and the current value Iha or Ihb rises from "0" and is kept at the constant value I0.

The first embodiment is configured as follows. The swing prevention circuit 11 is provided. The current determination unit 12 detects the timing of changing the value of the current Iha or Ihb flowing in the H-bridge circuit 5 or 6 during the off-period from the state of being smaller than the threshold current value −IL to the state of being larger than the threshold current value −IL. The re-turning-on instruction unit 13 causes the current controller 10 to regeneratively control the H-bridge circuit 5 or 6.

As a result, during the off-period after the control circuit 7 has executed "+energization" or "−energization" on the H-bridge circuit 5 or 6, it is possible to prevent the vibration from occurring after the flow of the current by the counter electromotive force generated in the stator coils 3A1, 3A2 or stator coils 3B1, 3B2, and hold the stepper motor 1 in a stably-rotating state.

In the above embodiment, as the regenerative control operation by the current controller 10, the MOS transistors 5a, 5b are turned on and the 5c and 5d are turned off in the H-bridge circuit 5. However, the MOS transistors 5c, 5d may be turned on and the MOS transistors 5a, 5b may also be turned off. The same applies to the H-bridge circuit 6.

In the above embodiment, in the H-bridge circuits 5, 6, the current detection resistors 5r, 6r are provided between the ground and the MOS transistors 5c and 6c as the low-side switches. However, the resistors 5r, 6r may also be provided between the DC power supply VD and the MOS transistor 5a, 6a as the high-side switches.

Second Embodiment

Figure 6:
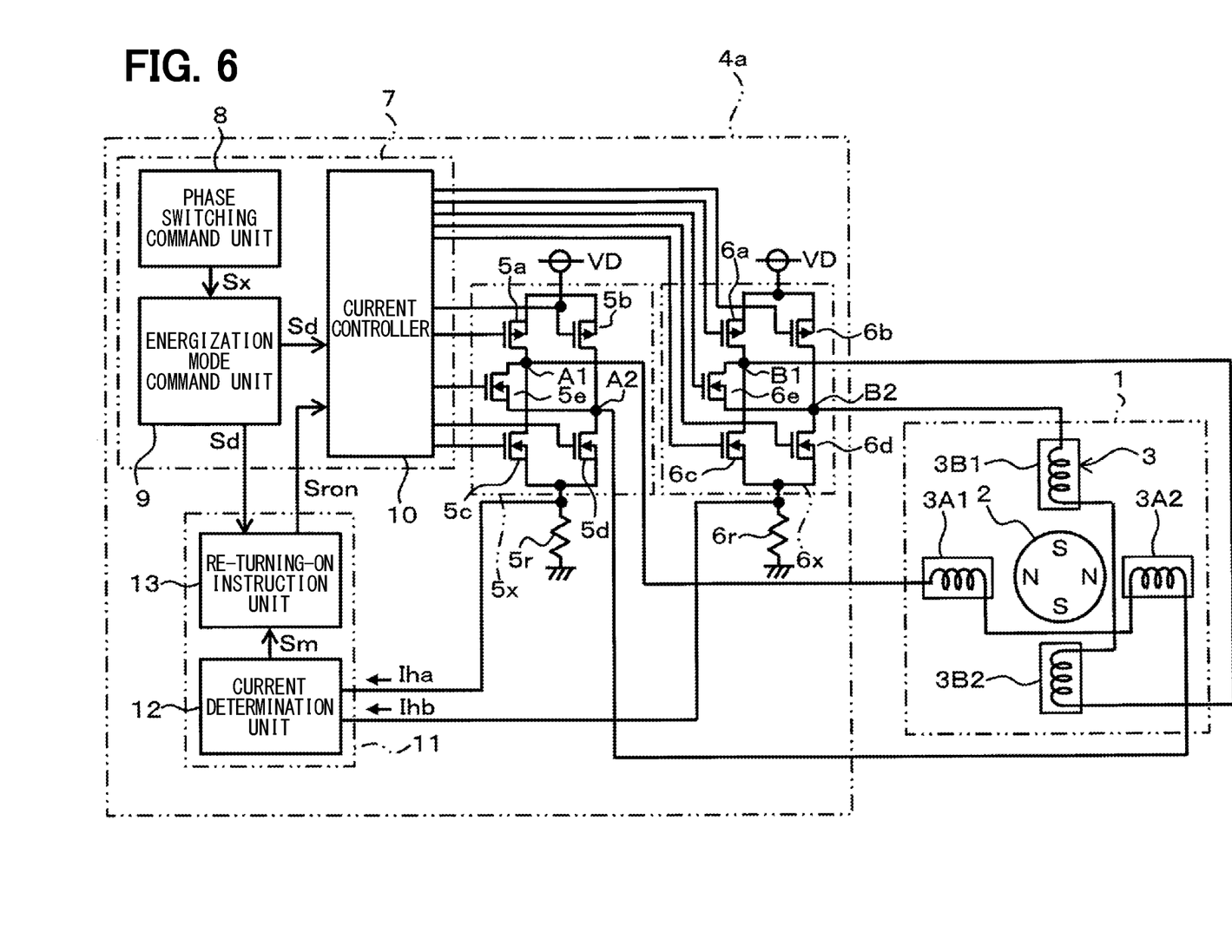
FIG. 6 is an electrical configuration diagram showing a second embodiment.

FIG. 6 shows a second embodiment. The following describes a part of the second embodiment different from the first embodiment. In the present embodiment, a stepper motor driving device 4a is configured such that as the H-bridge circuits 5x, 6x, MOS transistors 5e, 6e as short-circuit switches are added to the configuration of the H-bridge circuits 5, 6.

Either the MOS transistor 5e or 6e described above is an n-channel metal-oxide-semiconductor field-effect transistor (MOSFET). In the H-bridge circuit 5x, both terminals of the MOS transistor 5e are connected between the connection points A1 and A2. In the H-bridge circuit 6x, both terminals of the MOS transistor 6e are connected between the connection points B1 and B2. In either the MOS transistor 5e or 6e, a drive signal is applied from the current controller 10 to the gate.

In the present embodiment, the current controller 10 makes a shift to the "off" state after "+energization" or "−energization" has been executed on the A-phase. Subsequently, when receiving the re-turning-on instruction signal Sron from the re-turning-on instruction unit 13, the current controller 10 drives the MOS transistor 5e to be turned on, while holding the MOS transistors 5a to 5d in the off-state. Therefore, it may be possible to turn series circuit of the stator coils 3A1, 3A2 in the stepper motor 1 into the short-circuited state.

The current controller 10 makes a shift to the "off" state after "+energization" or "−energization" has been executed on the B-phase. Subsequently, when receiving the re-turning-on instruction signal Sron from the re-turning-on instruction unit 13, the current controller 10 drives the MOS transistor 6e to be turned on, while holding the MOS transistors 6a to 6d in the off-state. Therefore, it may be possible to turn the series circuit of the stator coils 3B1, 3B2 in the stepper motor 1 into the short-circuited state.

In the second embodiment, when the swing of the rotor 2 of the stepper motor 1 occurs, as in the first embodiment, it may be possible to generate current in a direction, in which the rotor 2 is prevented from swinging, in the stator coils 3A1, 3A2 or stator coils 3B1, 3B2 of the stator 3.

According to the second embodiment, the MOS transistor 5e directly generates a short-circuit between the connection points A1, A2 of the H-bridge circuit 5, or the MOS transistor 6e directly generates a short-circuit between the connection points B1, B2 of the H-bridge circuit 6. Therefore, it may be possible to achieve a closed circuit having a low impedance as compared to the configuration of the first embodiment, so that the vibration preventing effect may be improved as compared to the first embodiment.

The MOS transistors 5e, 6e as the short-circuit switches may be p-channel MOS transistors instead of n-channel MOS transistors.

Third Embodiment

Figure 7:
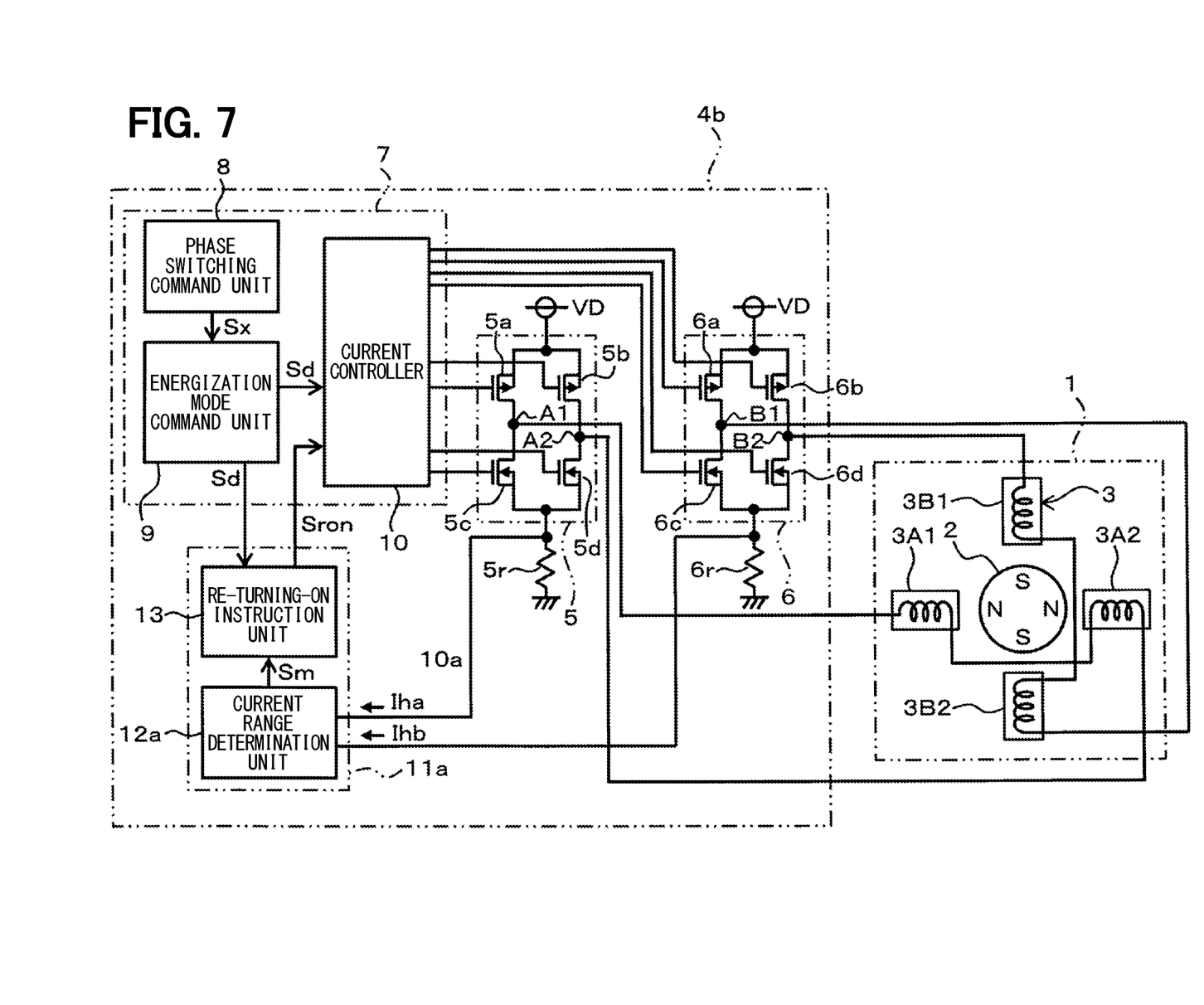
FIG. 7 is an electrical configuration diagram showing a third embodiment.

FIG. 7 shows a third embodiment. The following describes a part of the third embodiment different from the first embodiment. In the present embodiment, a stepper motor driving device 4b is configured to provide a swing prevention circuit 11a with a current range determination unit 12a as a current detector.

The current range determination unit 12a is configured not to determine the value of the current Iha or Ihb flowing in the resistor 5r or 6r of the H-bridge circuit 5 or 6 by using the threshold current value −IL, but to execute the determination based on whether the current value Iha or Ihb is included in a predetermined range for the re-turning-on instruction. Herein, as the predetermined range, for example, a range with an upper limit value Imax and a lower limit value Imin is set, and the current range determination unit 12a determines whether or not the current value Iha or Ihb is included in this range, that is, whether a condition expressed by the following equation (3) is satisfied.

$$Imax > Iha > Imin, \text{ or } Imax > Ihb > Imin \quad (3)$$

In practice, the current range determination unit 12a is configured to set a predetermined range based on an upper limit voltage Vmax and a lower limit voltage Vmin, respectively corresponding to the predetermined range based on the upper limit value Imax and the lower limit value Imin. The current range determination unit 12a is further configured to make comparison with the terminal voltage Vha of the current detection resistor 5r or the terminal voltage Vhb of the current detection resistor 6r. Hence, the relationship of the above equation (3) may be expressed as the following equation (4) when expressed using the voltage values Vha and Vhb.

$$Vmax > Vha > Vmin, \text{ or } Vmax > Vhb > Vmin \quad (4)$$

The values Vha, Vhb correspond to the current values Iha, Ihb. Specifically, the values Vha, Vhb are negative voltage values. Therefore, as the predetermined range corresponding to the threshold current value −IL, the lower limit voltage Vmin is a negative voltage value corresponding to the threshold current value −IL, and the upper limit voltage Vmax may be preferably set to "0" or a negative value larger than Vmin.

For example, when the upper limit voltage Vmax is set to "0 V," a determination operation is executed which is almost the same as that in the first embodiment where the determination is executed by comparison with the threshold current value −IL. In addition, the upper limit voltage Vmax can be set to a negative voltage value not being "0 V." In this case, the setting may be made without including a negative voltage value in the vicinity of "0 V," whereby the control may be executed such that, when the induced current due to the counter electromotive force becomes almost "0," the re-turning-on state is not held until the timing of "−energization" or "+energization" comes, but the re-turning-on state is cancelled when the holding of the re-turning-on state becomes substantially unnecessary.

Therefore, it may be possible to obtain the same effects as those of the first embodiment in the third embodiment. The current range determination unit 12a determines only a period during which the re-turning-on control is necessary, so that the control by the energization controller 10 may be executed.

Fourth Embodiment

Figure 8:
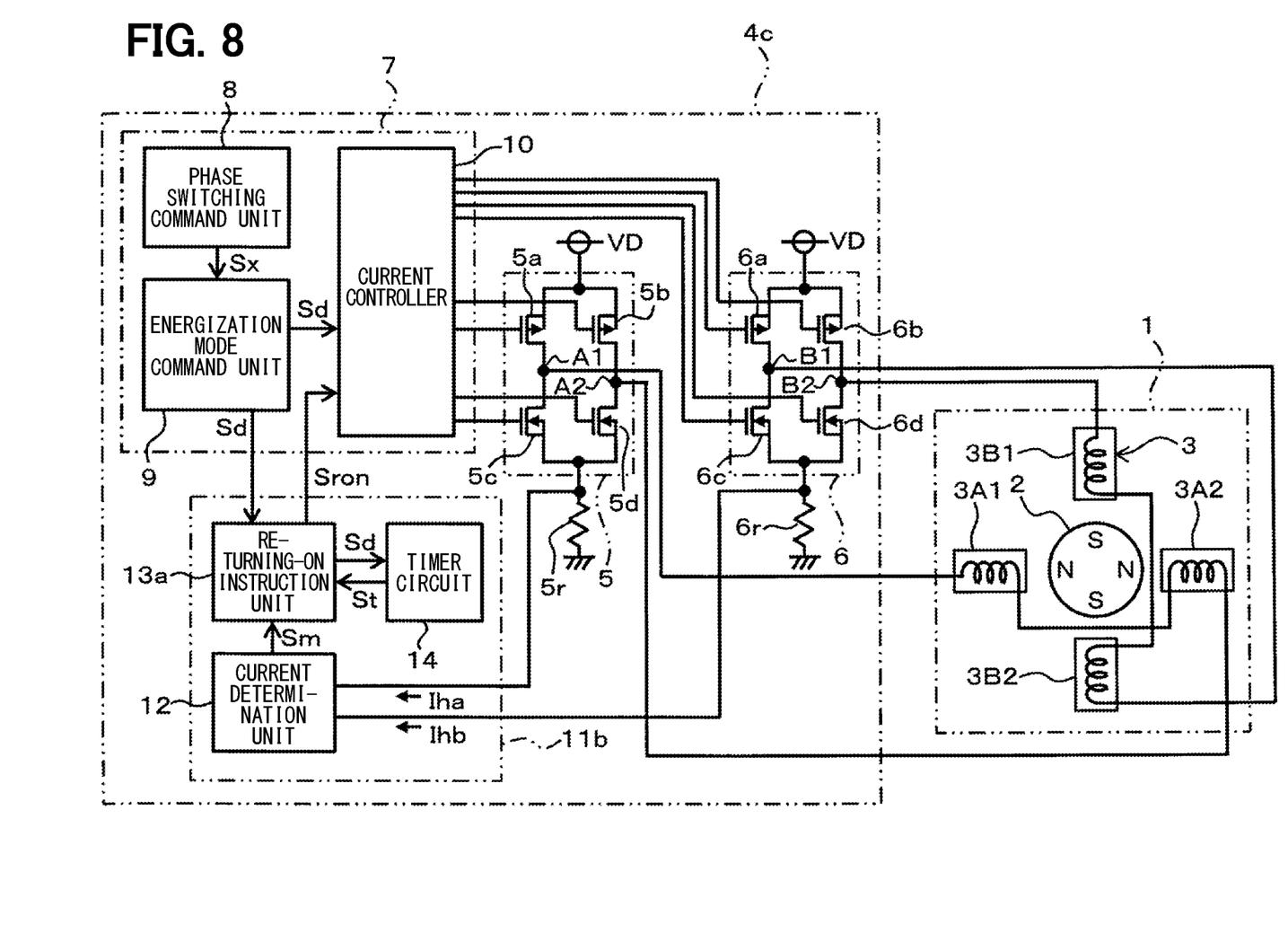
FIG. 8 is an electrical configuration diagram showing a fourth embodiment.
Figure 9:
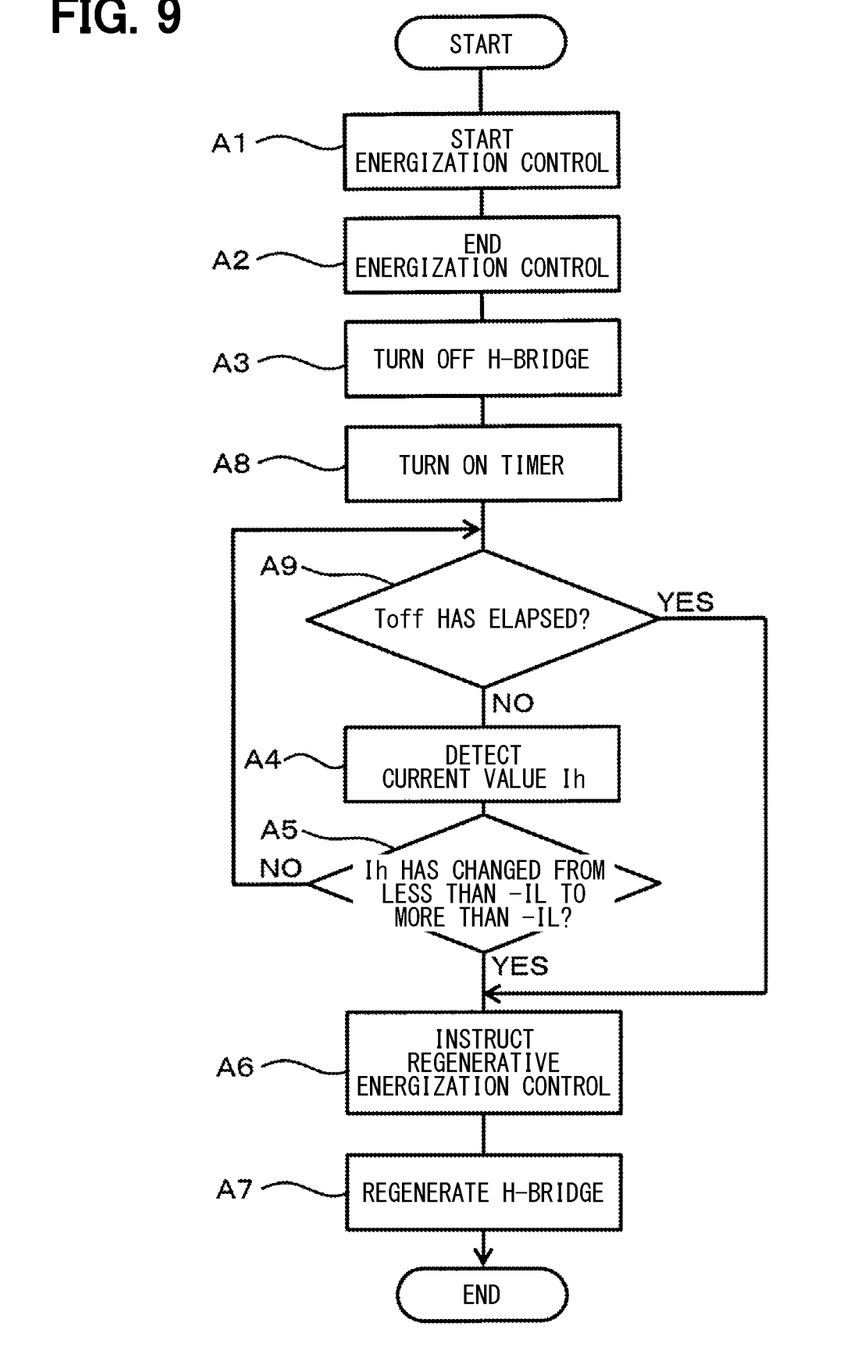
FIG. 9 is a diagram showing a flow of an energization control operation.

FIGS. 8 and 9 show a fourth embodiment. The following describes a part of the fourth embodiment different from the first embodiment. In the present embodiment, a timer circuit 14 is newly provided as a stepper motor driving device 4c in a swing prevention circuit 11b. A re-turning-on instruction unit 13a is configured to apply, to the timer circuit 14, the "off" energization mode signal Sd received from the energization mode command unit 9. The re-turning-on instruction unit 13a is further configured to receive a time-up signal St from the timer circuit 14.

When the "off" energization mode signal Sd received by the re-turning-on instruction unit 13a from the energization mode command unit 9 is input, the timer circuit 14 starts a timer operation to measure the time. When the measured time reaches a timer time Toff, the timer circuit 14 outputs the time-up signal St to the re-turning-on instruction unit 13a.

In addition to the same function as that in the first embodiment, the re-turning-on instruction unit 13a is configured to output the re-turning-on signal Sron to the current controller 10 also when the time-up signal St is received from the timer circuit 14 while the "off" energization mode signal Sd has been received. That is, the re-turning-on instruction unit 13a outputs the re-turning-on signal Sron when receiving either the determination signal Sm or the time-up signal St while having received the "off" energization mode signal Sd.

The following describes the action of the above configuration with reference to FIG. 9.

FIG. 9 shows the flow of the control operation by the control circuit 7 as to a one-time energization control operation executed on the A-phase or the B-phase by the H-bridge circuit 5 or 6. The following describes a part different from the case of FIG. 2 shown in the first embodiment.

When the control circuit 7 executes steps A1 to A3 and turns off the energization to the H-bridge circuit 5 or 6, the "off" energization mode signal Sd is also applied to the timer circuit 14 at this time. In the subsequent step A8, the timer circuit 14 starts a timer operation and executes a time-measuring operation from the point in time of turning-off of the H-bridge circuit 5 or 6.

When the time measured by the timer circuit 14 has not reached the timer time Toff, the determination is NO in step A9, and the processing proceeds to step A4. Through steps A4, A5, the processing waits for the induced current Ih of the H-bridge circuit 5 or 6 to change to more than −IL.

In this state, the cycle of steps A9, A4, and A5 is executed repeatedly. The processing waits for turning into either a state where the time measured by the timer circuit 14 first reaches the timer time Toff or a state where the induced current Ih changes to more than −IL.

For example, when the determination is YES in step A5 first, the re-turning-on signal Sron is applied to the current controller 10 in subsequent step A6 so that the regenerative energization is executed as in the first embodiment. In step A7, the current controller 10 may execute the regenerative energization control for the A-phase or the B-phase and execute the regenerative braking with the A-phase or the B-phase set as a closed-loop short-circuited state.

When the determination is YES in step A9, the processing proceeds to step A6 at this point, and the re-turning-on signal Sron is applied to the current controller 10 so that the regenerative energization is executed. In step A7, the current controller 10 executes the regenerative energization control for the A-phase or the B-phase.

In this case, a situation is where, even at the point in time of lapse of the timer time Toff, for some reason, the negative value of the current Iha or Ihb flowing in the H-bridge circuit 5 or 6 has not changed from the state of the above equation (1) to the state of the equation (2), and YES has not been determined in step A5.

In such a case, even when the negative value of the current Iha or Ihb flowing in the H-bridge circuit 5 or 6 does not exceed the threshold current −IL, the regenerative energization control is forcibly executed after the timer time Toff has elapsed. As a result, even when the rotor 2 of the stepper motor 1 is in a swinging state, it may be possible to restrain the swing forcibly.

According to the fourth embodiment, the timer circuit 14 is provided. Even when the negative value of the current Iha or Ihb flowing in the H-bridge circuit 5 or 6 does not exceed the threshold current −IL at the point in time of lapse of the timer time Toff, the regenerative energization control may be executed forcibly.

Fifth Embodiment

Figure 10:
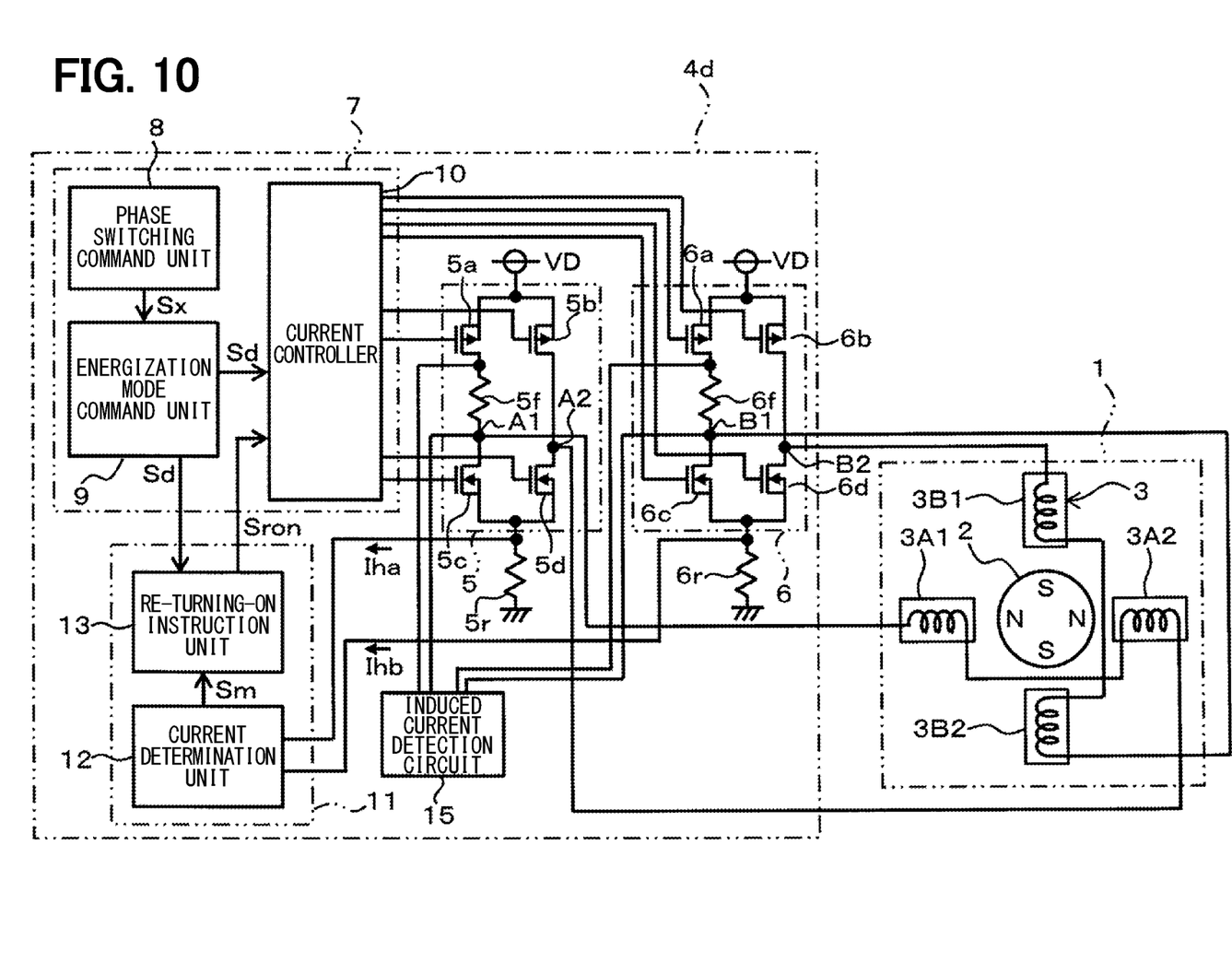
FIG. 10 is an electrical configuration diagram showing a fifth embodiment.

FIG. 10 shows a fifth embodiment. The following describes a part of the fifth embodiment different from the first embodiment. In the present embodiment, as the configuration of a stepper motor driving device 4d, a configuration to detect an induced current flowing in the H-bridge circuits 5, 6 is added.

As shown in FIG. 10, in the stepper motor driving device 4d, the H-bridge circuits 5, 6 are provided with induced current detection resistors (referred to as "resistors") 5f, 6f, respectively. Specifically, the resistor 5f is connected between the drain of the MOS transistor 5a and the connection point A1. The resistor 6f is connected between the drain of the MOS transistor 6a and the connection point B1. An induced current detection circuit 15 is newly provided and configured to detect the induced current based on the terminal voltages of the resistors 5f, 6f.

In the first embodiment, in the regenerative energization control for the A-phase or B-phase by the current controller 10, the current flowing in the closed loop is not detected in the case of the A-phase stator coils 3A1, 3A2 in the closed loop or in the case of the B-phase stator coils 3B1, 3B2 in the closed loop. In the present embodiment, with the configuration in which the resistors 5f, 6f for detecting the induced current is provided in the above closed loop, the detection may be executed by the induced current detection circuit 15.

According to the fifth embodiment, when the regenerative braking operation by the H-bridge circuit 5 or 6 is being executed, the current value of the induced current flowing in the closed loop of the stator coils 3A1, 3A2 or the closed loop of the stator coils 3B1, 3B2 is detected, so that the magnitude when the rotor 2 of the stepper motor 1 swings may be monitored by comparison with the magnitude of the above current value.

Sixth Embodiment

Figure 11:
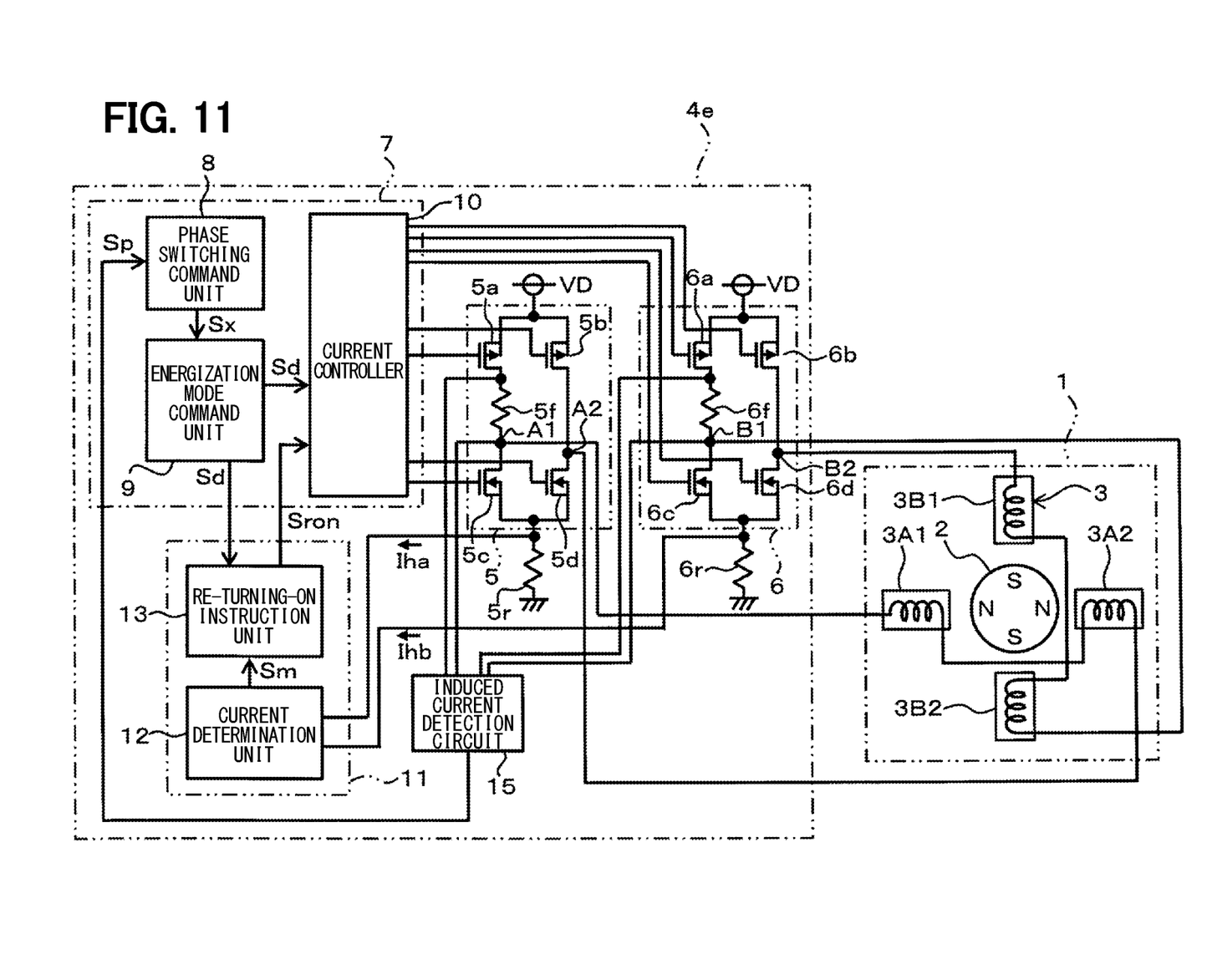
FIG. 11 is an electrical configuration diagram showing a sixth embodiment.
Figure 12:
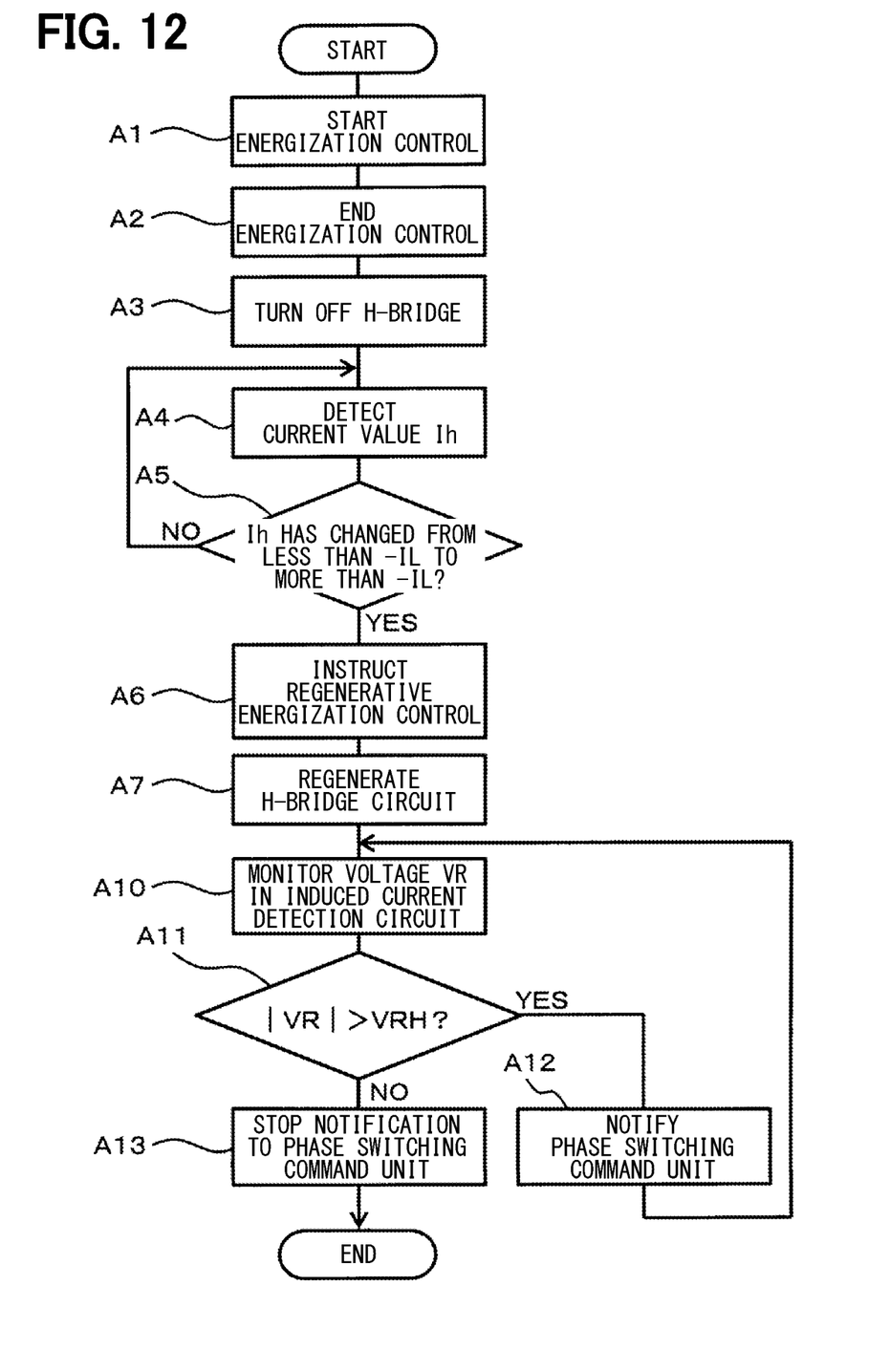
FIG. 12 is a diagram showing a flow of an energization control operation.

FIGS. 11 and 12 show a sixth embodiment. The following describes a part of the sixth embodiment different from the fifth embodiment b. In the present embodiment, the configuration is substantially the same as that of the fifth embodiment, but a stepper motor driving device 4e is configured to output a detection signal Sp to a phase switching command unit 8a when the current value of the induced current detected by the induced current detection circuit 15 is large.

In the present embodiment, a new control operation is executed on a detected voltage VR in accordance with the current value of the induced current flowing in the closed loop of the stator coils detected by the induced current detection circuit 15 when the regenerative braking operation is being executed.

Herein, the induced current detection circuit 15 monitors the state at the time when the re-turning-on instruction unit 13 applies the re-turning-on signal Sron to the current controller 10 so that the regenerative energization is executed on the stator coils by the H-bridge circuit 5 or 6. The induced current detection circuit 15 outputs the detection signal Sp to the phase switching command unit 8a when the detected voltage VR corresponding to the induced current which flows in the closed loop exceeds the threshold voltage VRH. The phase switching command unit 8a is configured such that, when the detection signal Sp is input from the induced current detection circuit 15, the phase switching command unit 8a stops the next energization operation on the H-bridge circuit 5 or 6 and turns into a standby state.

The following describes the operation of the above configuration with reference to FIG. 12.

FIG. 12 shows the flow of a single energization control operation executed on the A-phase or the B-phase by the H-bridge circuit 5 or 6. The following describes a part different from the case of FIG. 2 shown in the first embodiment.

The stepper motor driving device 4e executes steps A1 to A3 in the same manner as described above to de-energize the H-bridge circuit 5 or 6, and the processing proceeds to step A4. In the same manner as described above, through steps A4, A5, the processing waits for the induced current Ih of the H-bridge circuit 5 or 6 to change to more than −IL. When the determination is YES in step A5, in step A6, the re-turning-on signal Sron is applied to the current controller 10 so that the regenerative energization is executed as in the first embodiment. In step A7, the current controller 10 may execute the regenerative energization control for the A-phase or the B-phase and execute the regenerative braking with the A-phase or the B-phase set as a closed-loop short-circuited state.

At this time, the stepper motor driving device 4e proceeds to the subsequent step A10, and the induced current detection circuit 15 detects the induced current flowing in the resistor 5f or 6f of the H-bridge circuit 5 or 6. When the detected voltage VR corresponding to the induced current has exceeded the threshold voltage VRH, the induced current detection circuit 15 determines YES in step A11, and the processing proceeds to step A12 to output the detection signal Sp to the phase switching command unit 8a.

The induced current detection circuit 15 returns to step A10, and subsequently repeats steps A10 to A12 during a period when the detected voltage VR exceeds the threshold voltage VRH. When the determination is NO in step A11, the processing proceeds to step A13 to stop the output of detection signal Sp to the phase switching command unit 8a.

During the period when the detection signal Sp is being applied from the induced current detection circuit 15, the phase switching command unit 8a is in the state of stopping the next energization to the H-bridge circuit 5 or 6. When the detection signal Sp is stopped, the phase switching command unit 8a starts the next energization to the H-bridge circuit 5 or 6.

As a result, it may be possible to prevent the start of energization to the H-bridge circuit 5 or 6 while the induced current continues to flow, and avoid the occurrence of a situation such as an out-of-step rotating state of the rotor 2 in the stepper motor 1.

Other Embodiments

Although the present disclosure has been made in accordance with the embodiments, it is understood that the present disclosure is not limited to such embodiments and structures. The present disclosure encompasses various modifications and variations within the scope of equivalents. In addition, while the various elements are shown in various combinations and configurations, which are exemplary, other combinations and configurations, including more, less or only a single element, are also within the spirit and scope of the present disclosure.

In each of the above embodiments, as the stepper motor 1, one having two phases of the A-phase and the B-phase has been shown, but the present disclosure is not limited to this example, but may be also applied to a bipolar stepper motor with a configuration having three or more phases.

It is noted that a flowchart or the processing of the flowchart in the present application includes sections (also referred to as steps), each of which is represented, for instance, as A1. Each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, the various combinations and configurations, other combinations and configurations, including more, less or only a single element, are also within the spirit and scope of the present disclosure.

What is claimed is:

1. A bipolar stepper motor driving device for driving a stepper motor including stator coils having a plurality of phases, the bipolar stepper motor driving device comprising:
    a plurality of H-bridge circuits provided correspondingly to the phases of the stator coils;
    a current detector configured to detect current flowing in the stator coils;
    a control circuit configured to execute drive control of the H-bridge circuits to switch respective states of the stator coils;
    a re-turning-on instruction unit configured to command the control circuit to switch into a short-circuited state a stator coil which has shifted from an energized state to an off-state among the stator coils, on a condition that an absolute value of a reverse current detected by the current detector has changed from a value larger than a threshold current value to a value smaller than the threshold current value; and
    an induced current detection resistor configured to detect an induced current, which flows in a case of the control circuit switching the stator coils into the short-circuited state,
    wherein each of the H-bridge circuits includes:
        a first series circuit in which a first switch and a second switch are connected in series; and
        a second series circuit in which a third switch and a fourth switch are connected in series,
    wherein the first series circuit and the second series circuit are connected in parallel,
    wherein the induced current detection resistor is connected between the first switch and the second switch, and
    wherein the induced current detection resistor has an end connected to the first switch and another end connected to the second switch such that the induced current detection resistor is connected between the first switch and the second switch in series.

2. The bipolar stepper motor driving device according to claim 1,
    wherein each of the H-bridge circuits has two high-side switches and two low-side switches, and
    wherein, in a case of the control circuit switching the stator coil into the short-circuited state, the control circuit turns on the two high-side switches or turns on the two low-side switches.

3. The bipolar stepper motor driving device according to claim 1,
    wherein each of the H-bridge circuits includes a short-circuit switch, which generates a short-circuit in the corresponding stator coil, and
    wherein the control circuit turns on the short-circuit switch to switch the stator coil into the short-circuited state.

4. The bipolar stepper motor driving device according to claim 1,
    wherein the re-turning-on instruction unit is further configured to command the control circuit to switch into the short-circuit state a stator coil which has shifted from the energized state to the off-state among the stator coils, on a condition that the absolute value of the reverse current detected by the current detector is in a predetermined range with the current threshold value set as an upper limit value.

5. The bipolar stepper motor driving device according to claim 1, further comprising:
    a timer circuit configured to start a time-measuring operation in response to that the corresponding H-bridge circuit shifts from the energized state to the off-state,
    wherein the re-turning-on instruction unit commands the control circuit switch into the short-circuited state a stator coil which has shifted from the energized state to the off-state among the stator coils, on a condition that: (i) the timer circuit has measured a predetermined time interval in the time-measuring operation; and (ii) the absolute value of the reverse current detected by the current detector has changed from a value larger than the threshold current value to a value smaller than the threshold current value.

6. The bipolar stepper motor driving device according to claim 1,
    wherein the current detector is further configured to detect current flowing in each of the stator coils based on a terminal voltage of each of current detection resistors, which is connected to a high-potential side of the H-bridge circuits in series or connected to a low-potential side of the H-bridge circuits in series.

7. The bipolar stepper motor driving device according to claim 1, further comprising:
    an induced current detection circuit configured to detect the induced current flowing in each of the stator coils based on a terminal voltage of the induced current detection resistor.

8. The bipolar stepper motor driving device according to claim 7,
    wherein the control circuit is further configured to stop the drive control of the H-bridge circuits, on a condition that a value of the induced current is more than a predetermined value.

9. The bipolar stepper motor driving device according to claim 1,
    wherein each of the H-bridge has a MOSFET,
    wherein the MOSFET has a parasitic diode, and
    wherein the reverse current flows through the parasitic diode.

10. The bipolar stepper motor driving device according to claim 1,
- wherein each of the H-bridge circuits includes a short-circuit switch, which generates a short-circuit in the corresponding stator coil,
- wherein the off-state refers to a situation in which a power supply stops energization of the corresponding H-bridge to turn off the corresponding stator coil,
- wherein the short-circuited state refers to a situation in which the short-circuit is generated in the corresponding coil, and
- wherein the energized state refers to a situation in which the power supply energizes the corresponding H-bridge to drive the corresponding stator coil.

11. A bipolar stepper motor driving device for driving a stepper motor including a plurality of stator coils having different phases, the bipolar stepper motor driving device comprising:
- a plurality of H-bridge circuits provided correspondingly to the stator coils;
- a first control circuit configured to execute drive control of the H-bridge circuits to switch respective states of the stator coils;
- a second control circuit configured to:
  - detect current flowing in each of the stator coils, and
  - command the first control circuit to switch into a short-circuited state a stator coil which has shifted from an energized state to an off-state among the stator coils, on a condition that an absolute value of a reverse current has changed from a value larger than a threshold current value to a value smaller than the threshold current value; and
- an induced current detection resistor configured to detect an induced current, which flows in a case of the control circuit switching the stator coils into the short-circuited state,
- wherein each of the H-bridge circuits includes:
  - a first series circuit in which a first switch and a second switch are connected in series; and
  - a second series circuit in which a third switch and a fourth switch are connected in series,
- wherein the first series circuit and the second series circuit are connected in parallel,
- wherein the induced current detection resistor is connected between the first switch and the second switch,
- wherein the induced current detection resistor has an end connected to the first switch and another end connected to the second switch such that the induced current detection resistor is connected between the first switch and the second switch in series, and
- wherein the reverse current is detected by the second control circuit.

* * * * *